May 22, 1962        B. D. MORGAN        3,035,957

ADHESIVE PRODUCT HAVING A LINER WITH EMBRITTLED ZONES

Filed July 21, 1958

INVENTOR.
BURTON D. MORGAN

BY *Ely, Pearne & Gordon*

ATTORNEYS

United States Patent Office 3,035,957
Patented May 22, 1962

3,035,957
ADHESIVE PRODUCT HAVING A LINER WITH EMBRITTLED ZONES
Burton D. Morgan, Painesville, Ohio, assignor, by mesne assignments, to Avery Adhesive Products, Inc., a corporation of California
Filed July 21, 1958, Ser. No. 749,837
3 Claims. (Cl. 154—53.5)

This invention relates to adhesive products such as labels, stickers, tapes, and similar articles. More particularly, the invention relates to adhesive products having backings to protect the adhesive surface prior to use.

Fibrous materials such as paper, cloth, and the like have been commonly employed as backings to protect the adhesive surface of products such as labels, tapes, etc. However, one of the problems encountered in the use of these protectors is that while the backing must remain securely in contact with the adhesive surface during manufacture and sale, the backing also must be capable of being easily removed by the consumer at the time that the label or tape is being used.

Many suggestions have been made as to ways of removing protective backings simply and easily. Dreher U.S. Patent No. 2,364,607 is directed to a method in which the center portion of the backing for an adhesive tape is split and the area of adhesive tape under the split is not coated with an adhesive (which otherwise would come through the split). The ungummed portion provides a free edge which can be grasped to remove the protective backing sheet. The backing sheet may be divided into two sections overlapping in the center. In this case, the overlapping non-adhering portion of the outside backing sheet provides a free edge for removal of the first section, and the non-adhering center portion of the other backing sheet acts as a starting point for removal of the second section.

Although these methods make removal of protective backings somewhat easier, the fact that an ungummed starting point must be provided creates additional problems. For example, when the top surface of a label having a backing sheet of the type described above is printed, there are variations in the printing on the gummed areas as against the ungummed areas. Also, when two overlapping sections are used, there are printing variations between the overlapping and the non-overlapping sections.

These shortcomings are completely eliminated with the new and improved adhesive products of the present invention. The protective backings can be removed from the adhesive products of the invention easily and simply. Also, since the surface of the label or tape has a continuous adhesive surface, printing of the improved products can be accomplished successfully without variations in the intensity of printing. Thus, the adhesive products of the present invention achieve the objectives heretofore desired but unattainable and, in addition, provide flexibility of manufacture and use which was not heretofore possible, and all this without any substantial increase in the cost of the product.

An object of the present invention is to provide an adhesive product having a backing protecting the adhesive surface thereof which may be removed easily and simply.

Another object of the invention is to provide an adhesive product which has convenient pick-off means for its protective member or backing but which can be successfully printed without variations in the intensity of printing.

Other objects and advantages of the invention will be apparent from the following detailed description and drawing, in which.

A protective flexible backing sheet 11, which is in contact with an adhesive surface 12 of a sticker 13, has a number of narrow embrittled transverse zones 14, 15, and 16 across the surface thereof.

Figure 1:
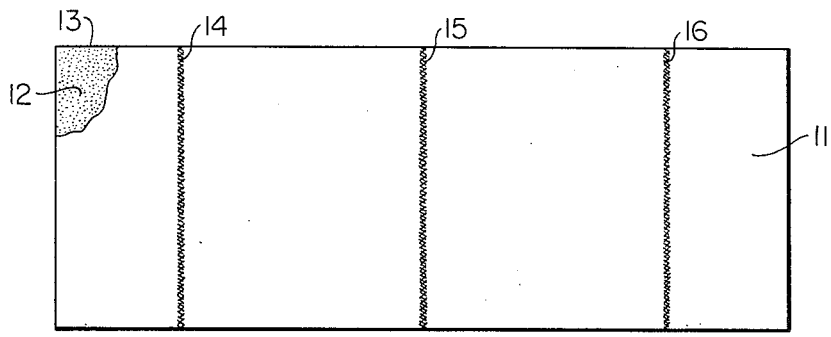
FIGURE 1 is a view of an adhesive sticker of the invention, looking at the protective backing.
Figure 2:
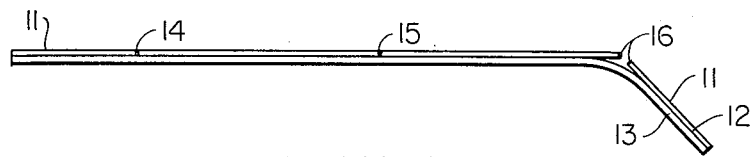
FIGURE 2 is an edge view of the sticker in a bent position showing a break in the protective backing.

Backing sheet 11 may be easily and simply removed from sticker 13 by first bending the composite product at or near one of the embrittled zones 16. As shown in FIGURE 2, a sufficient degree of bending causes the embrittled zone to rupture dividing the protective backing into two parts.

Figure 3:
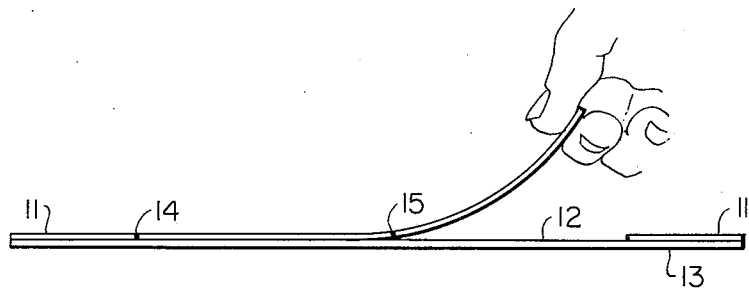
FIGURE 3 is an edge view of the sticker showing the removal of a portion of the protective backing.

The divided backing then may be removed by grasping an edge of the backing at the point of rupture and peeling that part of the backing from the adhesive surface as shown in FIGURE 3. A backing sheet containing a plurality of embrittled zones may as shown in the drawing be removed by the rupture of only one zone with the other embrittled zones remaining intact as the backing is peeled from the adhesive surface. This feature provides flexibility and added convenience in the use of the adhesive products enabling the consumer to adapt his procedure to the particular conditions of use.

In the same way, the remaining part of the backing also may be removed from the adhesive surface.

In accordance with the invention, narrow zones of a conventional protective backing made of a fibrous material such as paper, cloth, or the like are subjected to treatment with an agent which causes the treated portions of the backing to become brittle. This brittleness results in the backings being relatively weak when subjected to bending stresses so that the backing may be easily divided by bending. However, the treated portions of the backing protect the adhesive and prevent its coming through unless and until the backing is bent.

The embrittled zones of the backing paper may be produced, for example, by applying heat, a flame, a chemical substance such as sulfuric acid, or ultraviolet irradiation, or the like, to partially degrade or decompose a portion of the paper. This is accompanied by a change of color which aids the user in finding the location of the "split" when the backing is to be removed.

Generally, the narrow zones will take the form of thin straight linear sections running across the backing. However, they may be rendered in any desired shape, for example, they may outline a design or identifying mark for product identification.

The protective backings of the present invention may be employed with any conventional pressure-sensitive adhesive articles such as, for example, labels, stickers, tapes, and similar products. The products may comprise a paper, plastic, or cloth web having an adhesive coating thereon.

It will be apparent to one skilled in the art that various modifications may be made in the products described without departing from the scope of the invention. Therefore, the invention will be limited only by the following claims.

What is claimed is:

1. An adhesive product comprising a web having an adhesive coating on one surface, and a protective flexible fibrous backing sheet in contact with said adhesive coating and constituting means for protecting and for accomplishing containment of said adhesive coating, said backing sheet integrally including at least one narrow embrittled zone of an area which is small as compared to remaining areas of said backing sheet and said remaining areas of said backing sheet being located at both sides of said at least one zone, said at least one zone integrally forming part of said means for protecting and for accomplishing containment of said adhesive coating.

2. An adhesive product comprising a web having an adhesive coating on one surface, and a protective flexible fibrous backing sheet in contact with said adhesive coating and constituting means for protecting and for accomplishing containment of said adhesive coating, said backing sheet integrally including at least one narrow embrittled zone of partial degradation which is self-sustaining under the tension required to peel the backing sheet off of the adhesive coating, said at least one zone being of an area which is small as compared to remaining areas of said backing sheet and said remaining areas of said backing sheet being located at both sides of said at least one zone, said at least one zone integrally forming part of said means for protecting and for accomplishing containment of said adhesive coating.

3. An adhesive product comprising a web having an adhesive coating on one surface, and a protective flexible fibrous backing sheet combined with said web in apposite relationship with said adhesive coating and constituting means for protecting and for accomplishing containment of said adhesive coating, said backing sheet integrally including at least one narrow embrittled zone of partial degradation of an area which is small as compared to remaining areas of said backing sheet and said remaining areas of said backing sheet being located at both sides of said at least one zone, said at least one zone integrally forming part of said means for protecting and for accomplishing containment of said adhesive coating.

References Cited in the file of this patent

UNITED STATES PATENTS

| | | |
|---|---|---|
| 2,069,333 | Salfisberg | Feb. 2, 1937 |
| 2,083,617 | Salfisberg | June 15, 1937 |
| 2,103,386 | Salfisberg | Dec. 28, 1937 |
| 2,147,384 | Salfisberg | Feb. 14, 1939 |
| 2,246,984 | Palmer | June 24, 1941 |
| 2,278,673 | Savada et al. | Apr. 7, 1942 |
| 2,622,656 | Pinsky | Dec. 23, 1952 |
| 2,681,732 | Brady | June 22, 1954 |
| 2,703,764 | Vogt | Mar. 8, 1955 |
| 2,732,065 | Marchese | Jan. 24, 1956 |